US007472180B2

(12) United States Patent
Dini et al.

(10) Patent No.: US 7,472,180 B2
(45) Date of Patent: Dec. 30, 2008

(54) PREVENTING DEADLOCK IN A POLICY-BASED COMPUTER SYSTEM

(75) Inventors: Cosmin Nicu Dini, San Jose, CA (US); Petre Dini, San Jose, CA (US); Dragan Milosavljevic, San Jose, CA (US); Manuela I. Popescu, San Jose, CA (US)

(73) Assignee: Cisco Technology, Inc., San Jose, CA (US)

( * ) Notice: Subject to any disclaimer, the term of this patent is extended or adjusted under 35 U.S.C. 154(b) by 771 days.

(21) Appl. No.: 10/977,275

(22) Filed: Oct. 29, 2004

(65) Prior Publication Data

US 2006/0095552 A1  May 4, 2006

(51) Int. Cl.
*G06F 15/16* (2006.01)

(52) U.S. Cl. ............... 709/223; 709/224; 709/225; 340/825; 370/252; 714/39

(58) Field of Classification Search ............... 709/223, 709/224, 225; 340/825; 370/252; 714/39
See application file for complete search history.

(56) References Cited

U.S. PATENT DOCUMENTS

| | | | |
|---|---|---|---|
| 6,201,996 B1 * | 3/2001 | Crater et al. | 700/9 |
| 6,505,244 B1 * | 1/2003 | Natarajan et al. | 709/223 |
| 6,751,662 B1 * | 6/2004 | Natarajan et al. | 709/223 |
| 7,130,770 B2 * | 10/2006 | Di Palma et al. | 702/186 |
| 7,213,068 B1 * | 5/2007 | Kohli et al. | 709/225 |
| 7,257,833 B1 * | 8/2007 | Parekh et al. | 726/1 |

OTHER PUBLICATIONS

Clemm. Alexander, et al., "Policy-enabled mechanisms for feature interactions: reality, expectations, challenges," Computer Networks 45, 2004, pp. 585-603.
Friedman-Hill, Ernest J., Jess® The Rule Engine for the Java™ Platform, Jess Version 7.0b4 Draft, Sandia National Laboratories, Nov. 1, 2005, 109 pages.

* cited by examiner

*Primary Examiner*—Jinsong Hu
(74) *Attorney, Agent, or Firm*—Hickman Palermo Truong & Becker LLP

(57) ABSTRACT

Methods and mechanisms for preventing deadlock in a policy-based computer system are disclosed. In one embodiment, the method includes various machine-implemented steps, such as a step of receiving policy information based upon decisions about system configurations. At least one policy includes at least one action that has a post condition. Satisfaction of the post condition triggers at least one subsequent action or decision. The policy includes an indication whether the at least one subsequent action or decision should proceed if the action fails to satisfy the post condition. The at least one action is executed. Then, if the action fails to satisfy the post condition, a determination is made whether the at least one subsequent action or decision can proceed based upon the indication.

30 Claims, 6 Drawing Sheets

PREVENTING DEADLOCK IN A POLICY-BASED COMPUTER SYSTEM

FIELD OF THE INVENTION

The present invention generally relates to techniques for controlling behavior of a computer system. The invention relates more specifically to techniques for preventing deadlock in a policy-based computer system.

BACKGROUND OF THE INVENTION

The approaches described in this section could be pursued, but are not necessarily approaches that have been previously conceived or pursued. Therefore, unless otherwise indicated herein, the approaches described in this section are not prior art to the claims in this application and are not admitted to be prior art by inclusion in this section.

Complex distributed computer systems require system designers to adhere to various design constraints to represent the behavior of system components in computer program logic. Various organizations are focusing on developing general frameworks, languages, or products for enabling policy-driven mechanisms to cope with this complexity. Examples of such organizations include technical groups, such as the Internet Engineering Task Force (IETF), the Distributed Management Task Force (DMTF), the Object Management Group (OMG), the Organization for the Advancement of Structured Information Standards (OASIS), and Tele-Management Forum (TMF); academic institutions, such as Imperial College; and industry, including Evidian, ILOG and others.

However, conventional policy-based approaches suffer numerous disadvantages. For example, such approaches do not allow creating and implementing policy statements or expressions in which an action can fail but the action chain completes. Such approaches also do not allow policy statements or expressions in which repeated attempts to successfully complete an action are performed.

Another drawback of conventional approaches is that such approaches do not provide a mechanism for specifying that a "tentatively complete action" may be skipped, or for conditionally skipping some actions. Typically, this is because a tentatively complete action creates potential inconsistencies among dependent actions. When a policy is executed, most policy-based systems assume that the actions specified in a policy are performed. However, when a tentatively complete action is introduced, the successful execution of all actions, satisfying all action dependencies, is questionable. This can occur when the network status unexpectedly changes, or when some actions partially fail and therefore some postconditions may not hold. In this case, if all subsequent policy actions following a partially successful one are not accommodated, the managed system will be in a deadlock state, unstable or in an unknown state.

In the process of designing policy-driven systems, the granularity levels of policies vary and the mechanisms supporting policy specifications are more detailed when they are closer to the policy target. There is a disconnect between policy specifications at higher levels and policy implementation due to the mechanisms mismatch. As a result, it is difficult to convey to the lower levels (implementation), directives driven by objective functions (high levels). Practically, the programmer has no direct instructions on how to handle exceptions, or how to decide on a high-level system-wide problem based on a narrowed local execution exceptions Current policy-based systems cannot accommodate the foregoing issues.

Based on the foregoing, there is a clear need for a technique for identifying what actions may, in some contexts, not terminate successfully and building policy-based management systems accordingly.

BRIEF DESCRIPTION OF THE DRAWINGS

The present invention is illustrated by way of example, and not by way of limitation, in the figures of the accompanying drawings and in which like reference numerals refer to similar elements and in which.

DETAILED DESCRIPTION OF THE PREFERRED EMBODIMENT

Figure 1:
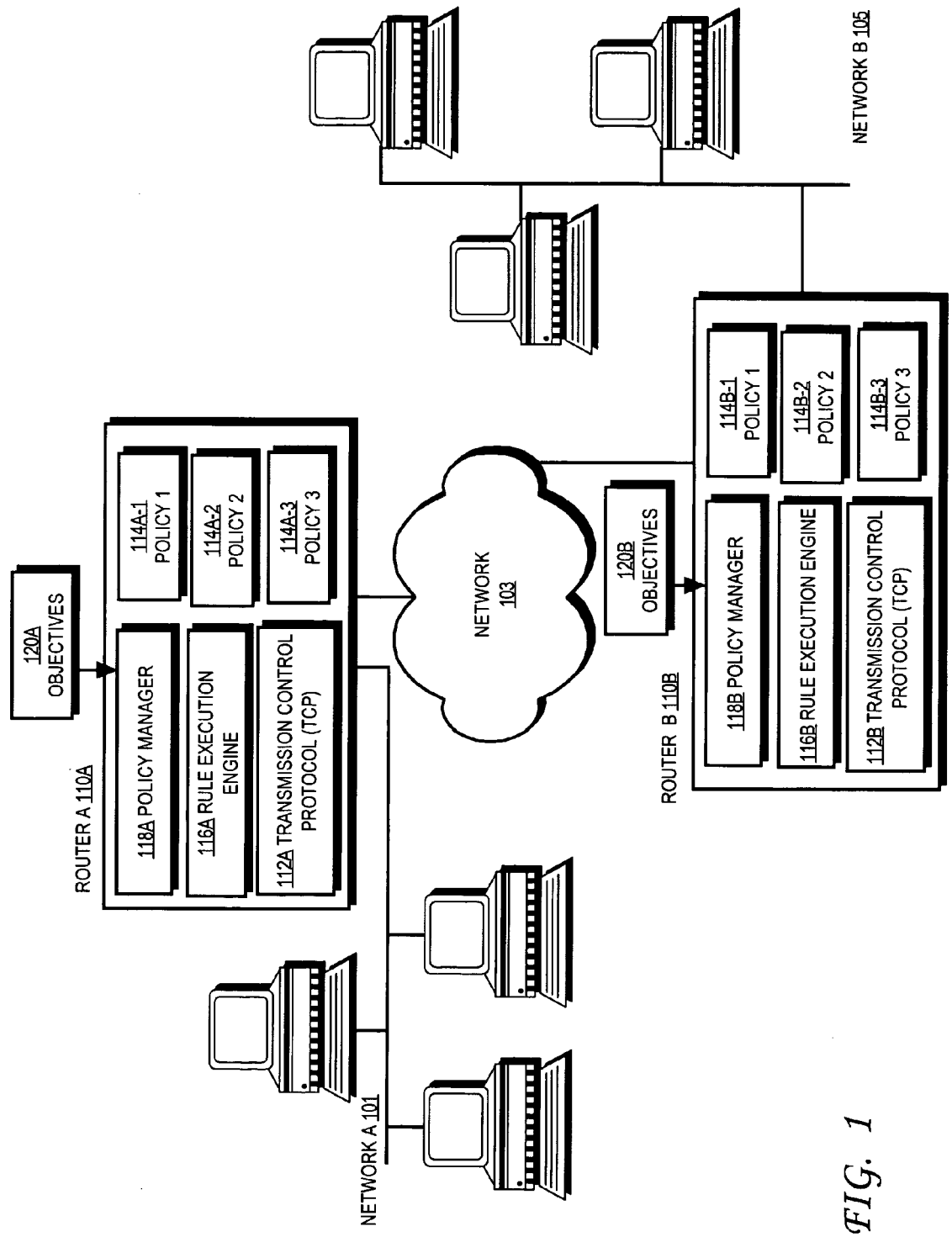
FIG. 1 is a block diagram depicting an example network in which preventing deadlock in a policy-based computer system may be implemented.

A method and apparatus for preventing deadlock in a policy-based computer system is described. In the following description, for the purposes of explanation, numerous specific details are set forth in order to provide a thorough understanding of the present invention. It will be apparent, however, to one skilled in the art that the present invention may be practiced without these specific details. In other instances, well-known structures and devices are shown in block diagram form in order to avoid unnecessarily obscuring the present invention.

Embodiments are described herein according to the following outline:

1.0 General Overview
    2.0 Structural and Functional Overview
    3.0 Method of Preventing Deadlock In Policy-Design Constraints
        3.1 Defining An Action Model That Captures The Execution Semantic
        3.2 Defining An Action Mode Construct
        3.3 Example implementations
    4.0 Implementation Mechanisms—Hardware Overview
    5.0 Extensions and Alternatives 1.0 General Overview The needs identified in the foregoing Background, and other needs and objects that will become apparent for the following description, are achieved in the present invention, which comprises, in one aspect, a method for preventing deadlock in a policy-based computer system using machine-implemented steps, including receiving policy information based upon decisions about system configurations. A policy includes at least one action that has a post condition. Satisfaction of the post condition triggers a subsequent action or decision. The policy includes an indication whether the at least one subsequent action or decision should proceed if the action fails to satisfy the post condition. The at least one action is executed. Then, if the action fails to satisfy the post condition, a determination is made whether the at least one subsequent action or decision can proceed based upon the indication.

In one embodiment, objectives for the system configurations are received. These objectives are converted into the policy information. In one embodiment, the step of converting the objectives into the policy information includes determining from the objectives, a mode for the at least one action. The mode indicates whether the at least one subsequent action or decision should proceed if the action fails to satisfy the post condition.

In one embodiment, the step of determining whether the at least one subsequent action or decision can proceed based upon the indication includes performing the at least one subsequent action or decision, thereby preventing a deadlock.

In one embodiment, the step of determining whether the at least one subsequent action or decision can proceed based upon the indication includes evaluating at least one of a plurality of results from execution of the at least one of a plurality of actions. From evaluating the at least one of a plurality of results, a determination is made whether execution of the at least one of a plurality of actions satisfied the post condition. At least one subsequent action or decision that can proceed is selected based upon which of the at least one of a plurality of actions satisfied the post condition and the indication.

In one embodiment, the step of selecting at least one subsequent action or decision that can proceed based upon which of the at least one of a plurality of actions satisfied the post condition and the indication includes performing the selected subsequent action or decision. In one embodiment, the step of selecting at least one subsequent action or decision that can proceed based upon which of the at least one of a plurality of actions satisfied the post condition and the indication includes selecting at least one of a redo, a redo_until, a go_to, an only_if_next, an alternate_action, an only_if_preceding, a jump_end, a jump_head, a nill and other action mode constructs are contemplated.

In one embodiment, the method also includes the steps of receiving information about results of performing the selected at least one subsequent action or decision and adjusting the objectives from which the policy information was determined. In one embodiment, the method further includes the step of sending the policy information to a rule based execution device that performs the evaluating, determining and selecting steps.

In one embodiment the step of evaluating at least one of a plurality of results from execution of the at least one of a plurality of actions includes a step of evaluating a plurality of results from execution of the plurality of actions on a plurality of nodes.

In other aspects, the invention encompasses a computer apparatus and a machine-readable medium configured to carry out the foregoing steps.

2.0 Structural and Functional Overview

Embodiments of the present invention enable preventing deadlock in a policy-based computer system. In one embodiment, a policy-based system may comprise a business layer, design layer, and implementation layer. In this context, the business layer specifies the high level goal (objective) in general terms, either in a plain English text form, or a semi-structured specification form. For example, a goal may be: "The following security degrees must be supported by a managed system when handling the management data: noAuth-NoPriv, authNoPriv, and authPriv." In other embodiments, goals are less deterministic, and may be expressed with statements like "when possible . . . " or "it is recommended that . . . ."

The design layer introduces a formal discipline, in which decisions are captured in policies. Policies are groupings of rules with a particular dependency, which tie an objective to targets and refine the objective according to concrete actions and conditions. For example, at the design level, a policy for a network management computer system may specify that different versions of simple network management protocol (SNMP) and authorization and authentication methods may be identified and combined.

The implementation layer is a logically lowest layer at which decisions may be implemented in terms of rules by rule engines. Rules consist of conditions and actions. Rules derived from policy specifications may use other status data provided to resources, entity access rights, conditions, security rules, or specify certain types of execution engines supporting the prescribed actions as well.

FIG. 1 is a block diagram depicting an example network in which preventing deadlock in a policy-based computer system may be implemented. For purposes of illustrating a clear example, FIG. 1 shows an embodiment of peered router devices supporting Transmission Control Protocol (TCP) sessions in an IP network environment. However, the present invention does not require such implementation, and in some embodiments, the techniques described herein may be implemented using other transport mechanisms and for other protocols and/or in other types of peered devices, such as routers, gateways, wireless access points or various combinations thereof.

In the example configuration depicted by FIG. 1, router 110A includes a mechanism for converting objectives into executable policies. In other embodiments, a mechanism for converting objectives into executable policies is performed using digital data processing devices other than a router. For example, in alternative embodiments, other nodes on network A 101, network B 105 or another network may perform conversion and send policies to routers 110A, 110B.

Router 110A also may include a policy engine for executing policies. In one embodiment, a policy engine runs as a part of management software in a separate computer system. For example, all routers can send alarms to the management software that is registered with the routers to receive alarms and these alarms are processed based on the policies and rules. It is possible that policy engine can also run on the router 110A. Router 110A connects Network A 101 to other networks, such as network 103. Router 110A is communicatively coupled to a second router 110B through the network 103. In the example illustrated by FIG. 1, router 110B also includes a mechanism for converting objectives into policies. Additionally, router 110B also includes a policy engine for executing the policies. In the embodiment illustrated by FIG. 1, peered routers 110A, 110B enable devices on network A 101 and on network B 105 to communicate with one another and to other devices not shown in FIG. 1.

Networks 101 and 105 may be any type of network and may be different from one another. For example, networks 101, 103 and 105 may be one or more other public networks or one or more private networks in various embodiments. Routers 110A, 110B comprise a transmission control protocol (TCP) stack 112A, 112B, which enables communications with one another and with other peers. For purposes of illustrating a clear example, FIG. 1 shows the example of TCP 112A, 112B sessions between routers 110A, 110B connected back to back over network 103. In other embodiments, different connection techniques are used.

Some of the policies produced by a management application from high-level objectives may be sent to router 110B for execution. Similarly, some of the policies produced by router 110B from high-level objectives may be sent to router 110A for execution.

In one embodiment, routers 110A, 110B include respective policy managers 118A, 118B for managing the conversion of objectives 120A, 120B into policies 114 and the execution and exchanging of policies between routers 110A, 110B by processes described in further detail below with reference to FIGS. 2A-2D. In alternative embodiment, the policy manager 118A, 118B may be imbedded in an operating system of a router 110A or 110B, a process remotely located on a separate platform from router 110A or 110B or integrated or partially integrated with another process (not shown).

As can be seen from FIG. 1, routers 110A, 110B include one or more policies 114A-1 through 114A-3 and 114B-1 through 114B-3. The routers 110A, 110B exchange policies with one another so that the policies can be executed on one or both of routers 110A, 110B as needed in order to enable business objectives 120A, 120B to be met. Further, in one embodiment, one or more of policies 114A-1 through 114A-3 and 114B-1 through 114B-3 may execute on more than one machine.

Each of the routers 110A, 110B includes a respective rule execution engine 116A, 116B. Rule execution engines 116A, 116B execute one or more of the policies 114A-1 through 114A-3 and 114B-1 through 1 14B-3 to implement the objectives 120A, 120B on routers 110A, 110B. This approach enables routers 110A, 110B to function in a manner consistent with business objectives, for example. The approach also avoids errors caused by imperfect communications between business people, who set objectives, and programmers, who implement technology in an organization.

In one embodiment, in response to executing one or more of the policies 114A-1 through 114A-3 and 114B-1 through 114B-3, rule execution engines 116A, 116B will receive information about results of performing actions or decisions and adjust the objectives 120 and/or the policies 114. This approach provides a feedback mechanism upon which one or more of the policies 114A-1 through 114A-3 and 114B-1 and/or the objectives 120A, 120B may be adjusted.

Figure 2A:
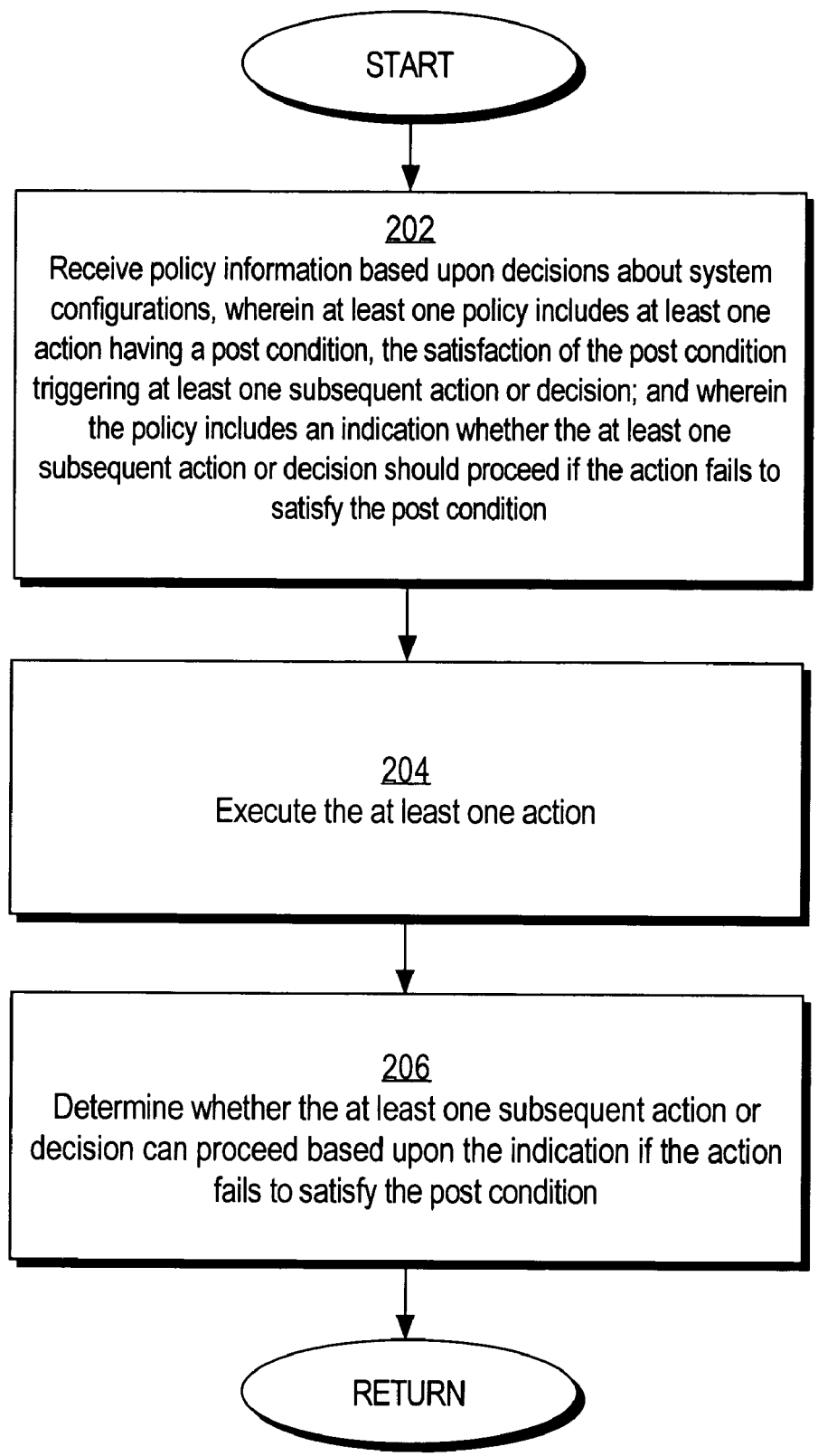
FIG. 2A is a flow diagram that illustrates a high level overview of one embodiment of a method for preventing deadlock in a policy-based computer system operable with the example of FIG. 1.

FIG. 2A is a flow diagram that illustrates a high level overview of one embodiment of a method for preventing deadlock in a policy-based computer system. The steps of FIG. 2A, FIG. 2B, FIG. 2C, FIG. 2D may be performed, for example, using computer program instructions or other software elements. The instructions or software elements may form part of a network management system or other distributed computer system.

As shown in FIG. 2A, block 202, policy information that is based upon decisions about system configurations is received. At least one policy includes at least one action that has a post condition. Satisfaction of the post condition triggers at least one subsequent action or decision. The policy includes an indication whether the at least one subsequent action or decision should proceed if the action fails to satisfy the post condition.

At block 204, at least one action is executed. If the action fails to satisfy the post condition, then at block 206 a determination is made whether the at least one subsequent action or decision can proceed based upon the indication.

Figure 2B:
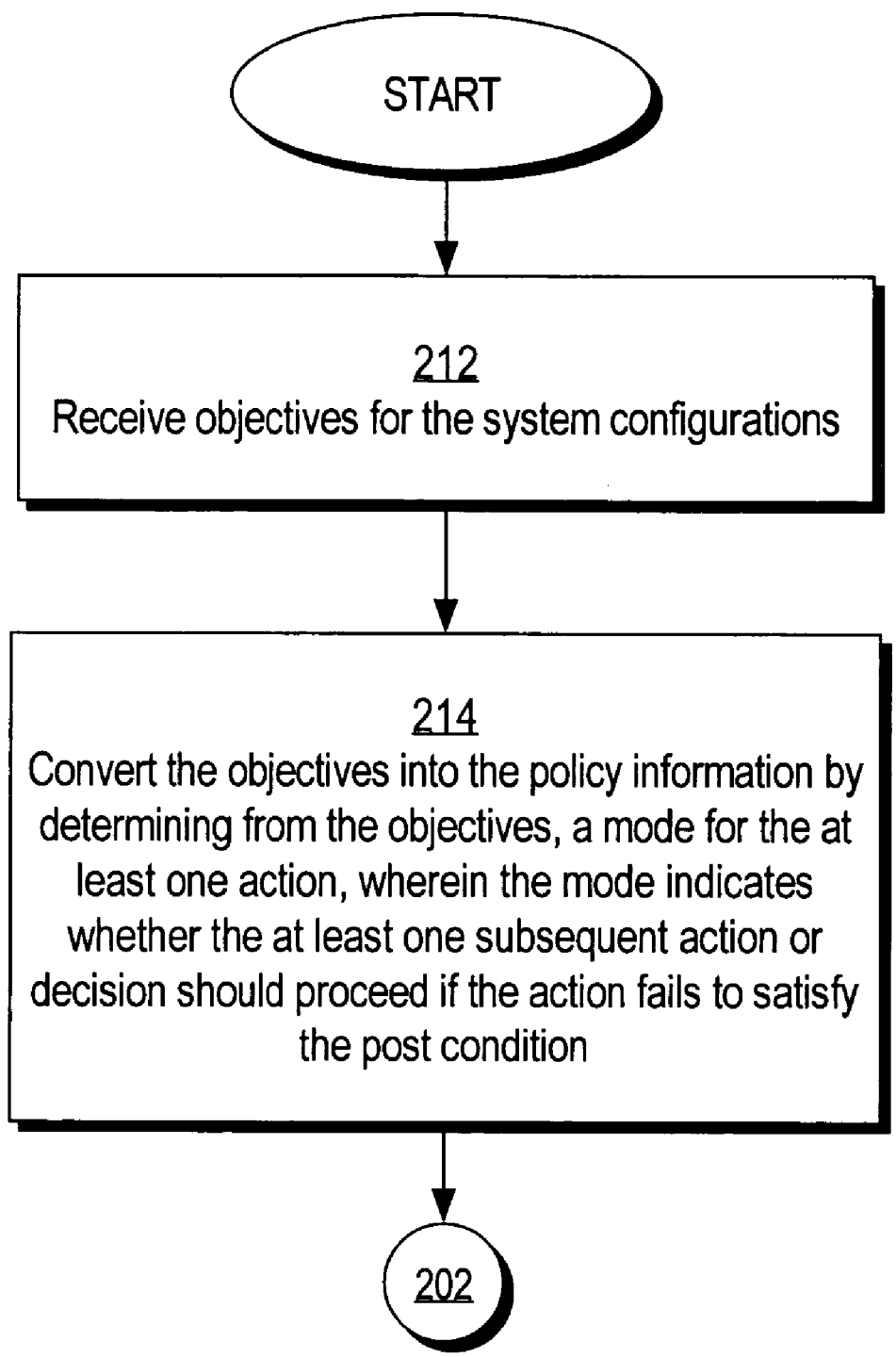
FIG. 2B is a flow diagram that illustrates a high level overview of a process for converting a high-level goal or objective into one or more policies operable with the embodiment depicted by FIG. 2A.

FIG. 2B is a flow diagram that illustrates a high level overview of a process for converting a high-level goal or objective into one or more policies operable with the processing depicted by FIG. 2A in one embodiment. At block 212, objectives for the system configurations are received. At block 214, the objectives are converted into the policy information by determining from the objectives, a mode for the at least one action, wherein the mode indicates whether the at least one subsequent action or decision should proceed if the action fails to satisfy the post condition.

Figure 2C:
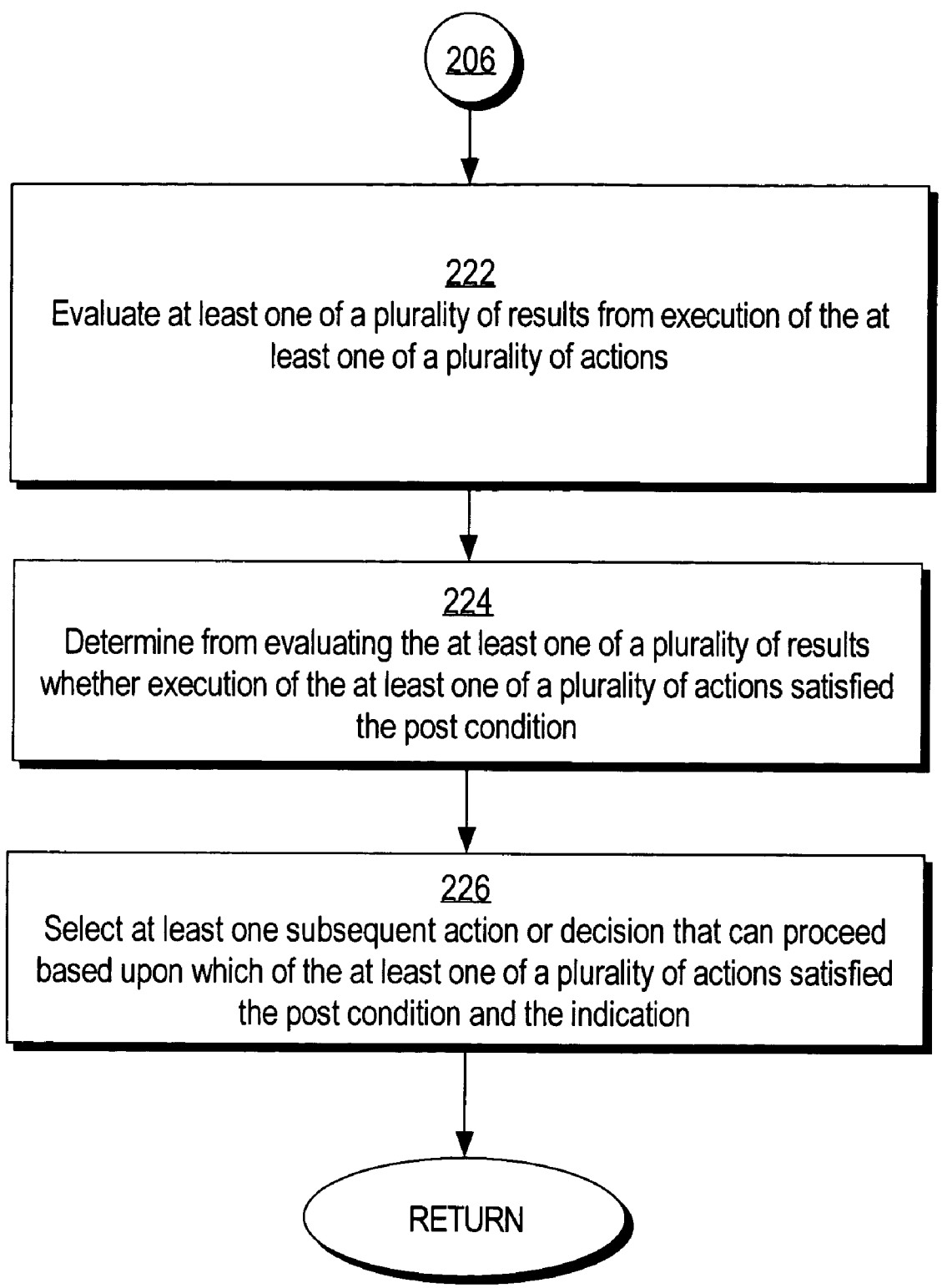
FIG. 2C is a flow diagram that illustrates a high level overview of a process for determining whether at least one subsequent action or decision can proceed operable with the embodiment depicted by FIG. 2A.

FIG. 2C is a flow diagram that illustrates a high level overview of a process for determining whether at least one subsequent action or decision can proceed operable with the processing depicted by FIG. 2A in one embodiment. At block 222, at least one of a plurality of results from execution of the at least one of a plurality of actions is evaluated. From evaluating the at least one of a plurality of results, at block 224 a determination is made whether execution of the at least one of a plurality of actions satisfied the post condition. At block 226, at least one subsequent action or decision that can proceed is selected based upon which of the at least one of a plurality of actions satisfied the post condition and the indication.

Figure 2D:
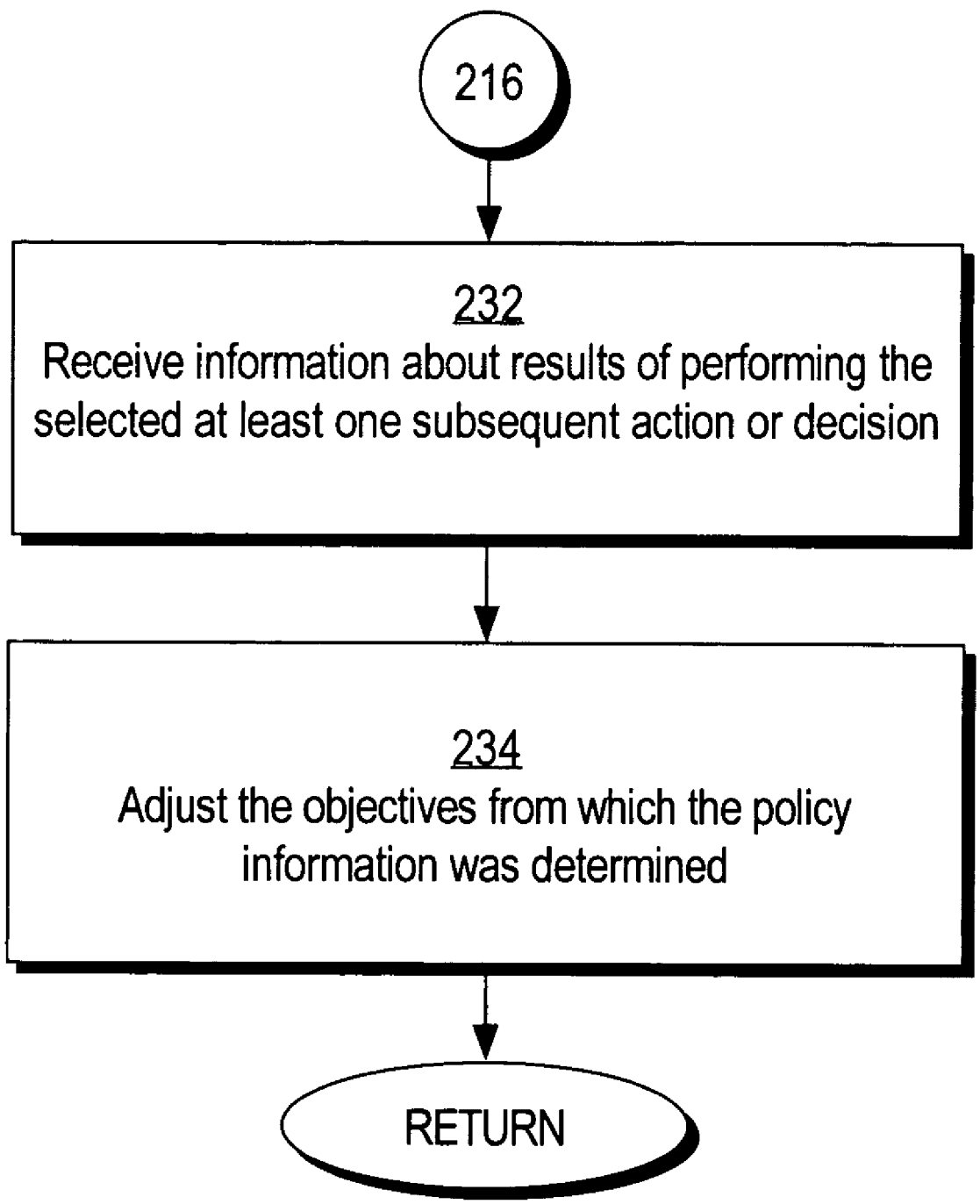
FIG. 2D is a flow diagram that illustrates a high level overview of a process for adjusting objectives in accordance with information about performance operable with the embodiment depicted by FIG. 2A.

FIG. 2D is a flow diagram that illustrates a high level overview of a process for adjusting objectives in accordance with information about performance operable with the processing depicted by FIG. 2A in one embodiment. At block 232, information about results of performing the selected at least one subsequent action or decision is received. The objectives from which the policy information was determined are adjusted at block 234.

3.0 Method of Preventing Deadlock in Policy-Design Contraints

To illustrate the use of deadlock-free policy-design constraints through multi-mode mechanism, an example of a series of policies will be used for determining a systems' behavior. A policy may be expressed as a function that relates pre-conditions to actions and actions to post-conditions. In a general sense, a policy is considered triggered when all its pre-conditions are satisfied. For example, a simple form of a policy may be expressed in an IF-THEN form, as shown in relation (1) below.

IF {<condition_1>... <condition_n>} THEN
    <action_1>... <action_k>     (1)

The actions performed when a policy is triggered may be: 1) a unique action with well-defined pre- and post-conditions; 2) a series of independent actions in which the post-conditions of one action do not relate the pre-conditions of the coming actions; and 3) a series of dependent actions in which the execution of one action is conditioned by the post-conditions of the preceding action.

3.1 Defining an Action Model that Captures the Execution Semantic

A new action model that captures the execution semantic is now described. An action has its own identification <action_ID, action_type>. For example, (rep1, report) defines an action of type report and having an ID "rep1."

An action has a special trigger event that is the event making the action to happen, assuming that all the action's pre-conditions hold. An action has also an associated performer. As one or many performers may perform the very same action, the illustrated format associates a performer identifier to an action. The post-conditions refer to the status of the action-parameters after the action is performed, or of any system parameter affected by the action. Any issues that may arise during an action execution are reported to the entity having the report_ID, as shown in line (2).

<trigger><performer_ID><target_ID><report_recipient_ID>&
<action_ID><action_type><pre_cond><do_action:"action_
where_what"><invariants><post_cond><action_mode>  (2)

The fields belong to three different categories. The first category formed by the fields <trigger><performer_ID><target_ID><report_recipient_ID> is commonly expressed by the policy body. In one embodiment, the trigger applies to the firstly executed action, while the remaining three are common for all the actions within a policy. In an alternative embodiment, the trigger may be different for different actions.

Performer, target, and report_recipient are entities that execute an action, the entity the action is acting on, and the entity receiving or polling the status of the execution (success, or failure), respectively. The report_recipient may be either set by the performer (CNS PerfE: Cisco Network Service Performance Engine), or embedded into the action execution. As an example, in the first case, if CNS PerfE polls the status of a device, the report-recipient is CNS PerfE; if this is detected as a security threat, an intrusion detection system is the report_recipient. Obviously, the payload message carried out as a reply is appropriate to each type of feedback.

The second category concerns the action (do_action) itself; all the pre- and post-conditions and invariants are well known components for defining an action and can take the form as shown in line (3):

<action_ID><action_type><pre_cond><do_action:
"action_where_what"><invariants><post_cond>  (3)

3.2 Defining an Action Mode Construct

A new construct, <action_mode> is introduced, which formalizes the "roll-ahead" concept. This construct enables defining the "roll-ahead" concept in virtually any type of action and action dependency including those identified in Table 1 below. When an action is marked as complying with "roll-ahead" the policy engine enables a subsequent dependent action to be executed even if the current action fails, or fails to complete. This means that the network status assumed by the pre-conditions of an action were not altered by the eventually failed post-conditions of the preceding action depending on the value of the <action_mode>.

The do_action specifies the action string name, e.g., SNMP GET, the location for acting, e.g., a given interface or port of a polled component, and precise a variable name the value of which is looked for. In one embodiment, the action_mode may be implemented as shown in Table 1, which follows:

TABLE 1

Sample Action Mode:

| Line No. | | |
|---|---|---|
| 1 | Action_mode::= roll-ahead \| | The post-conditions may be ignored if one or more of them do not hold |
| 2 | redo <#> \| | The action must be triggered a maximum number of <#>, until all its post-conditions hold |
| 3 | redo_until <condition> | The action must be triggered until <condition> holds and all action post-conditions hold |
| 4 | go_to <action> \| | When one or more of action post-conditions do not hold, and exception handling action <action> is triggered |
| 5 | only_if_next <action> \| | When the post-conditions do not hold, the policy is holding only when the next action is <action> |
| 6 | alternate_action <action> \| | This is a special case of robustness where <action> is not an exception handling, but an operational alternative for the action not guarantying its post-conditions |
| 7 | only_if_preceding <action> \| | When action post-conditions do not hold, the policy is active under the constraints that the preceding action is <action> |
| 8 | jump_end \| | When the action post-conditions do not hold, ends the policy entirely tracking the failing action <self> |
| 9 | jump_head \| | When the action post-conditions do not hold, restart the policy tracking the failing action <self> |
| 10 | nill | 'nill' or no label at all means that there are no special instrumentation on that action and its post-conditions will determine a policy to fail or succeed |

It is noteworthy that the very same action may be tagged with different mode labels, depending on the business rules.

There are actions that are not considered as "roll-ahead" actions, such "change_topology", or "change_configuration" actions. Other actions may be or may not be of "roll-ahead" type, such as "allow-access" without limitation, for example. In the last case, a second try is performed, but the network/system is kept stable and safe if the action fails (e.g., when logging, typing the password is allowed to fail three times by some systems, before denying any attempt).

Another case is executing dependent actions. For example, the output of a policy may be either "action_a" OR "action_b". In this case any action may be "roll-ahead", if individually the action could function as roll-ahead action. In the case where the policy output is "action_a" AND "action_b", it is assumed that if one action is considered as "roll-ahead", which equals potentially being "not correctly executed" or "not successfully executed", the entire policy must be considered of a "roll-ahead" type.

In one embodiment, when multiple dependent actions have to be executed, the post-conditions of those qualified as "roll-ahead" may be ignored. In other words, the pre-conditions of those actions relying on the post-conditions of that particular action should be considered true.

3.3 Example Implementations

The following examples are intended to illustrate various potential implementations of the techniques discussed herein. As such, these examples are intended to be illustrative, rather than limiting of the many embodiments of the present invention.

Particular engines may expose different capabilities in various embodiments. For purposes of illustrating a clear example, the description herein assumes that the Java® Expert System Shell (JESS) engine is used. Some assumptions facilitate specifying high level policies to be implemented in a rule or policy engine, such as: 1) The specification of an action follows the model pre-cond—action—post—cond, with other fields that are not pertinent to the approaches described herein; 2) The specification of an output of a policy has the capability to express dependencies between actions; and 3) An action fails/succeeds model with no multiple error feedback is used. In other words, a list of peers <feedback_error, action_mode> is recommended for any target action.

Table 2 illustrates an example policy that is implemented using JESS rules. The policy shown in Table 2 is based upon a business policy, which specifies that when the set of rules hold, the actions (SaveInDB ?a) (Publish ?a) are executed. There is no indication, however, if "?a" will be published in the event that the process of saving ?a in the database fails.

As shown in Table 2, the function SaveInDB is expressed to precede the function Publish in order to express that successful completion of SaveInDB is required for Publish to proceed. In one embodiment, JESS is adapted to capture this meaning using specific low-level rules. Presently, the by-default roll-ahead is used, with no indication from the high business policy level of how to resolve a failure of SaveInDB. In other words, the mechanism of indicating how to resolve a failure at the implementation level is not driven from the business level.

TABLE 2

Sample Implementation - Without deadlock prevention:

```
Line
No.

1   ;;;;;;;;;;;;;;;;;;;;;;;;;;;;;;;;;;;;;;;;;;;;;;;;
 2   ;; Define template Fault
 3   (deftemplate Fault
 4     (slot identifier (default "nil"))
 5     (slot description)
 6     (slot alertType)
 7     (slot time (default "nil"))
 8     (slot severity)
 9     (slot probableCause)
10   )
11
12
13   ;;;;;;;;;;;;;;;;;;;;;;;;;;;
14   ;;;; Save into database
15   (defrule SaveInDB
16           ?a <- (Fault
17                           (identifier ?identifierVar)
18                           (description ?descriptionVar)
19                           (alertType ?alertTypeVar)
20                           (time ?timeVar)
21                           (severity ?severityVar)
22                           (probableCause ?probableCauseVar)
23                   )
24           =>
25           (retract ?a)
26           (SaveInDB ?a) (Publish ?a)
27   )
28
29
30
31   ;;;;;;;;;;;;;;;;;;;;;;;;;;
32   ;;;; SaveInDB user function
33
34   import jess.*;
35
36   public class SaveInDB implements Userfunction
37   {
38       // The name method returns the name by which the function will appear in Jess
39   code.
40       public String getName( ) { return "SaveInDB"; }
41
42       public Value call(ValueVector vv, Context context) throws JessException
43           {
44   // some code here to try to store in DB; if successful return TRUE; otherwise FALSE
45           return new Value("TRUE", RU.ATOM);
46           }
```

TABLE 2-continued

Sample Implementation - Without deadlock prevention:

| Line No. | |
|---|---|
| 47 | } |
| 48 | |
| 49 | ;;;;;;;;;;;;;;;;;;;;;;;;;;;; |
| 50 | ;;;; PublishEvent user function |
| 51 | |
| 52 | import jess.*; |
| 53 | |
| 54 | public class PublishEvent implements Userfunction |
| 55 | { |
| 56 | // The name method returns the name by which the function will appear in Jess |
| 57 | code. |
| 58 | public String getName( ) { return "PublishEvent"; } |
| 59 | |
| 60 | public Value call(ValueVector vv, Context context) throws JessException |
| 61 | { |
| 62 | |
| 63 | // some code here to publish event |
| 64 | |
| 65 | } |
| 66 | } |
| 67 | |
| 68 | |
| 69 | |
| 70 | |

Table 3 shows a first solution in a low-level implementation without regard to the business level. At the implementations level, and with small modifications of two functions, i.e., by adding lines 32-34 into function SaveInDB and by adding lines 40-43 to test the result before publishing, it is possible to achieve the desired behavior.

TABLE 3

Sample Implementation - With deadlock prevention:

| Line No. | |
|---|---|
| 1 | ;; Define templates SaveInDBSuccessfull |
| 2 | (deftemplate IsSaveInDBSuccessfull |
| 3 | (slot successfullySaved) |
| 4 | (slot fault) |
| 5 | ) |
| 6 | |
| 7 | ;;;;;;;;;;;;;;;;;;;;;;;;;;;;;;;;;;;;;;;;;;;;;;;; |
| 8 | ;; Define template Fault |
| 9 | (deftemplate Fault |
| 10 | (slot identifier (default "nil")) |
| 11 | (slot description) |
| 12 | (slot alertType) |
| 13 | (slot time (default "nil")) |
| 14 | (slot severity) |
| 15 | (slot probableCause) |
| 16 | ) |
| 17 | |
| 18 | ;;;;;;;;;;;;;;;;;;;;;;;;;;;;; |
| 19 | ;;;; Save into database rule |
| 20 | (defrule SaveInDB |
| 21 | ?a <- (Fault |
| 22 | (identifier ?identifierVar) |
| 23 | (description ?descriptionVar) |
| 24 | (alertType ?alertTypeVar) |
| 25 | (time ?timeVar) |
| 26 | (severity ?severityVar) |
| 27 | (probableCause ?probableCauseVar) |
| 28 | ) |
| 29 | => |
| 30 | (retract ?a) |
| 31 | (assert (IsSaveInDBSuccessfull |

TABLE 3-continued

Sample Implementation - With deadlock prevention:

| Line No. | |
|---|---|
| 32 | (successfullySaved (SaveInDB ?a)) |
| 33 | (fault ?a)) |
| 34 | ) |
| 35 | |
| 50 | and both user functions SaveInDB and PublishEvent listed in Table 2 above |

The embodiment illustrated by Table 3 achieves results at the implementation level, however, no mechanism links the business level policy with the set of rules the programmer code in order to address the problem. In Table 4, another embodiment uses user-defined construct "only_if_preceding" and adds semantics, as illustrated in the example. This shows that, when a similar construct exists at the business level, one may map this to a native construct or a programmer defined one. In the example illustrated by Table 4, the only_if_preceding construct may be implemented using a built-in JESS command that would have the following semantic: if the first function returns TRUE, proceeds with the second function; otherwise do not execute the second function.

TABLE 4

Sample Implementation - With deadlock prevention:

| Line No. | |
|---|---|
| 1 | ;;;;;;;;;;;;;;;;;;;;;;;;;;;;;;;;;;;;;;;;;;;;;;;; |
| 2 | ;; Define template Fault |
| 3 | (deftemplate Fault |
| 4 | (slot identifier (default "nil")) |
| 5 | (slot description) |
| 6 | (slot alertType) |

TABLE 4-continued

Sample Implementation - With deadlock prevention:

| Line No. | |
|---|---|
| 7 | (slot time (default "nil")) |
| 8 | (slot severity) |
| 9 | (slot probableCause) |
| 10 | ) |
| 11 | |
| 12 | |
| 13 | ;;;;;;;;;;;;;;;;;;;;;;;;;;;; |
| 14 | ;;;; Save into database |
| 15 | (defrule SaveInDB |
| 16 | ?a <- (Fault |
| 17 | (identifier ?identifierVar) |
| 18 | (description ?descriptionVar) |
| 19 | (alertType ?alertTypeVar) |
| 20 | (time ?timeVar) |
| 21 | (severity ?severityVar) |
| 22 | (probableCause ?probableCauseVar) |
| 23 | ) |
| 24 | => |
| 25 | (retract ?a) |
| 26 | (only_if_preceding (SaveInDB ?a) (Publish ?a)) |
| 27 | ) |
| 28 | |
| 29 | |
| 30 | |
| 31 | and both user functions SaveInDB and PublishEvent listed in Table 2 above |

Even the engine language has no the appropriate constructs to support the action mode tags, a non-native one can be proposed and used. In Table 5, another implementation is provided in which, a precedence relationship has been provided as described above. As shown in Table 5, the condition to publish is expressed by enhancing the SaveInDB function as illustrated by lines 26-28.

TABLE 5

Sample Implementation - With deadlock prevention:

| Line No. | |
|---|---|
| 1 | ;;;;;;;;;;;;;;;;;;;;;;;;;;;;;;;;;;;;;;;;;;;;;;;;;; |
| 2 | ;; Define template Fault |
| 3 | (deftemplate Fault |
| 4 | (slot identifier (default "nil")) |
| 5 | (slot description) |
| 6 | (slot alertType) |
| 7 | (slot time (default "nil")) |
| 8 | (slot severity) |
| 9 | (slot probableCause) |
| 10 | ) |
| 11 | |
| 12 | |
| 13 | ;;;;;;;;;;;;;;;;;;;;;;;;;;;; |
| 14 | ;;;; Save into database |
| 15 | (defrule SaveInDB |
| 16 | ?a <- (Fault |
| 17 | (identifier ?identifierVar) |
| 18 | (description ?descriptionVar) |
| 19 | (alertType ?alertTypeVar) |
| 20 | (time ?timeVar) |
| 21 | (severity ?severityVar) |
| 22 | (probableCause ?probableCauseVar) |
| 23 | ) |
| 24 | => |
| 25 | (retract ?a) |
| 26 | (if (eq (SaveInDB ?a) TRUE) |
| 27 | then |
| 28 | (Publish ?a)) |
| 29 | ) |

TABLE 5-continued

Sample Implementation - With deadlock prevention:

| Line No. | |
|---|---|
| 30 | |
| 31 | and both user functions SaveInDB and PublishEvent listed in Table 2 above |

In Table 6, another implementation is provided in which, a precedence relationship has been provided as described above. As shown in Table 6, the condition to publish is expressed by enhancing the SaveInDB function as illustrated by lines 26-29.

TABLE 6

Sample Implementation - With deadlock prevention:

| Line No. | |
|---|---|
| 1 | ;;;;;;;;;;;;;;;;;;;;;;;;;;;;;;;;;;;;;;;;;;;;;;;;;; |
| 2 | ;; Define template Fault |
| 3 | (deftemplate Fault |
| 4 | (slot identifier (default "nil")) |
| 5 | (slot description) |
| 6 | (slot alertType) |
| 7 | (slot time (default "nil")) |
| 8 | (slot severity) |
| 9 | (slot probableCause) |
| 10 | ) |
| 11 | |
| 12 | |
| 13 | ;;;;;;;;;;;;;;;;;;;;;;;;;;;; |
| 14 | ;;;; Save into database |
| 15 | (defrule SaveInDB |
| 16 | ?a <- (Fault |
| 17 | (identifier ?identifierVar) |
| 18 | (description ?descriptionVar) |
| 19 | (alertType ?alertTypeVar) |
| 20 | (time ?timeVar) |
| 21 | (severity ?severityVar) |
| 22 | (probableCause ?probableCauseVar) |
| 23 | ) |
| 24 | => |
| 25 | (retract ?a) |
| 26 | (bind ?n 1) |
| 27 | (while ((<= ?n 10) & (eq (SaveInDB ?a) FALSE)) |
| 28 | (bind ?n (+ ?n 1))) |
| 29 | (Publish ?a) |
| 30 | ) |
| 31 | and both user functions SaveInDB and PublishEvent listed in Table 2 above |

The examples of Tables 2-6 illustrate that, if a condition is imposed on the dependency between two actions of a policy at the business level, and the action mode is specified, this condition and the action mode can be implemented in a native or non-native way in various embodiments. Moreover, the post-conditions of an action, when explicitly expressed, may have different action modes. Further, one of the various action modes may be recommended over the others according to a static and/or dynamic weighting. Accordingly, when an action fails with no error feedback one or more pairs <feedback_error, action_mode> specified may be invoked for any target action.

4.0 Implementation Mechanisms—Hardware Overview

Figure 3:
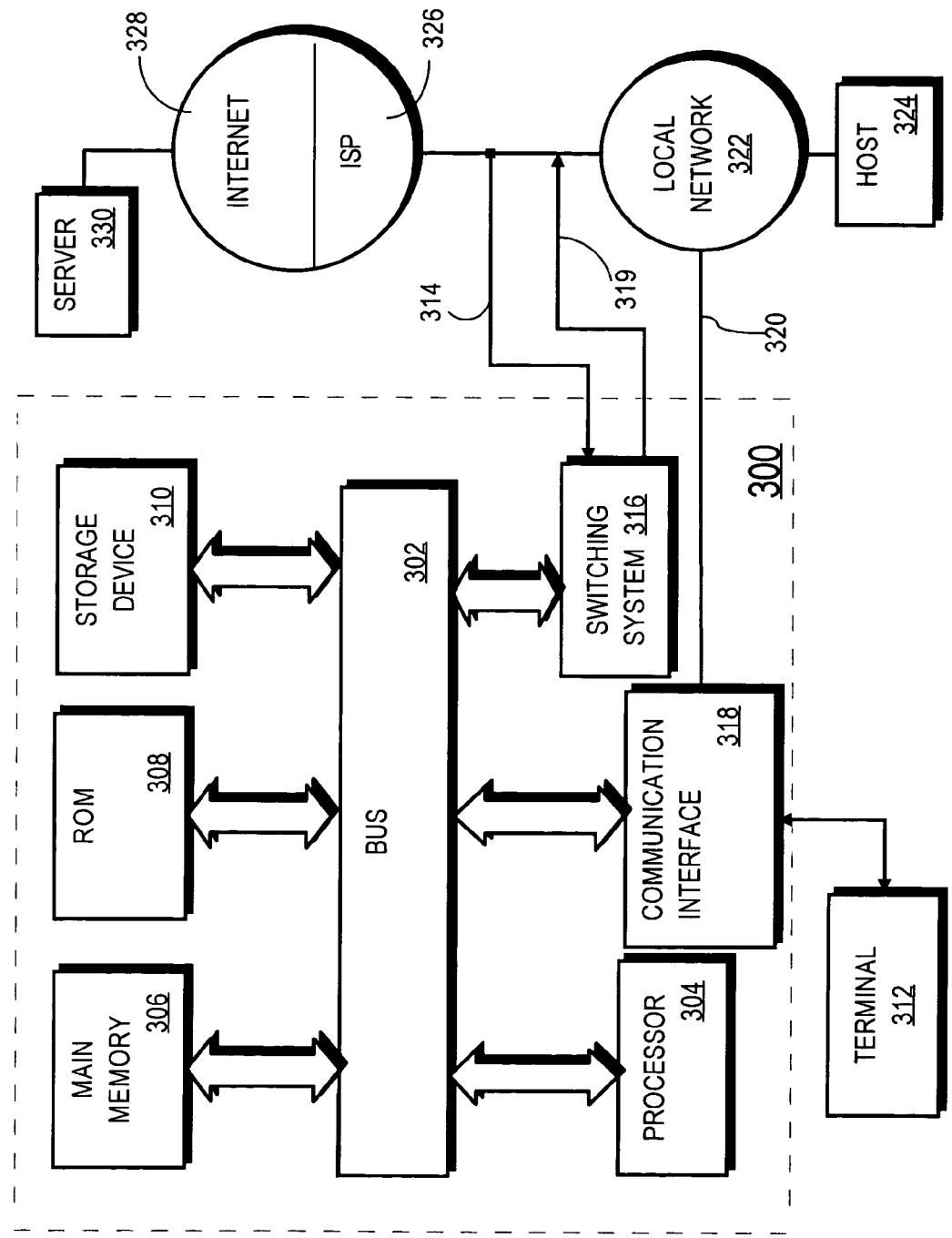
FIG. 3 is a block diagram that illustrates a computer system upon which an embodiment may be implemented.

FIG. 3 is a block diagram that illustrates a computer system 300 upon which an embodiment of the invention may be implemented. While the preferred embodiment is a management application, another embodiment could be implemented using one or more computer programs running on a network element such as a router device. Thus, in this embodiment, the computer system 300 is a router.

Computer system 300 includes a bus 302 or other communication mechanism for communicating information, and a processor 304 coupled with bus 302 for processing information. Computer system 300 also includes a main memory 306, such as a random access memory (RAM), flash memory, or other dynamic storage device, coupled to bus 302 for storing information and instructions to be executed by processor 304. Main memory 306 also may be used for storing temporary variables or other intermediate information during execution of instructions to be executed by processor 304. Computer system 300 further includes a read only memory (ROM) 308 or other static storage device coupled to bus 302 for storing static information and instructions for processor 304. A storage device 310, such as a magnetic disk, flash memory or optical disk, is provided and coupled to bus 302 for storing information and instructions.

A communication interface 318 may be coupled to bus 302 for communicating information and command selections to processor 304. Interface 318 is a conventional serial interface such as an RS-232 or RS-422 interface. An external terminal 312 or other computer system connects to the computer system 300 and provides commands to it using the interface 314. Firmware or software running in the computer system 300 provides a terminal interface or character-based command interface so that external commands can be given to the computer system.

A switching system 316 is coupled to bus 302 and has an input interface 314 and an output interface 319 to one or more external network elements. The external network elements may include a local network 322 coupled to one or more hosts 324, or a global network such as Internet 328 having one or more servers 330. The switching system 316 switches information traffic arriving on input interface 314 to output interface 319 according to pre-determined protocols and conventions that are well known. For example, switching system 316, in cooperation with processor 304, can determine a destination of a packet of data arriving on input interface 314 and send it to the correct destination using output interface 319. The destinations may include host 324, server 330, other end stations, or other routing and switching devices in local network 322 or Internet 328.

The invention is related to the use of computer system 300 for preventing deadlock in policy-design constraints. According to one embodiment of the invention, techniques for preventing deadlock in policy-design constraints are provided by computer system 300 in response to processor 304 executing one or more sequences of one or more instructions contained in main memory 306. Such instructions may be read into main memory 306 from another machine-readable medium, such as storage device 310. Execution of the sequences of instructions contained in main memory 306 causes processor 304 to perform the process steps described herein. One or more processors in a multi-processing arrangement may also be employed to execute the sequences of instructions contained in main memory 306. In alternative embodiments, hard-wired circuitry may be used in place of or in combination with software instructions to implement the invention. Thus, embodiments of the invention are not limited to any specific combination of hardware circuitry and software.

The term "machine-readable medium" as used herein refers to any medium that participates in providing instructions to processor 304 for execution. Such a medium may take many forms, including but not limited to, non-volatile media, volatile media, and transmission media. Non-volatile media includes, for example, optical or magnetic disks, such as storage device 310. Volatile media includes dynamic memory, such as main memory 306. Transmission media includes coaxial cables, copper wire and fiber optics, including the wires that comprise bus 302. Transmission media can also take the form of acoustic or light waves, such as those generated during radio wave and infrared data communications.

Common forms of machine-readable media include, for example, a floppy disk, a flexible disk, hard disk, magnetic tape, or any other magnetic medium, a CD-ROM, any other optical medium, punch cards, paper tape, any other physical medium with patterns of holes, a RAM, a PROM, and EPROM, a FLASH-EPROM, any other memory chip or cartridge, or any other medium from which a computer can read.

Various forms of computer readable media may be involved in carrying one or more sequences of one or more instructions to processor 304 for execution. For example, the instructions may initially be carried on a magnetic disk of a remote computer. The remote computer can load the instructions into its dynamic memory and send the instructions over a telephone line using a modem. A modem local to computer system 300 can receive the data on the telephone line and use an infrared transmitter to convert the data to an infrared signal. An infrared detector coupled to bus 302 can receive the data carried in the infrared signal and place the data on bus 302. Bus 302 carries the data to main memory 306, from which processor 304 retrieves and executes the instructions. The instructions received by main memory 306 may optionally be stored on storage device 310 either before or after execution by processor 304.

Communication interface 318 also provides a two-way data communication coupling to a network link 320 that is connected to a local network 322. For example, communication interface 318 may be an integrated services digital network (ISDN) card or a modem to provide a data communication connection to a corresponding type of telephone line. As another example, communication interface 318 may be a local area network (LAN) card to provide a data communication connection to a compatible LAN. Wireless links may also be implemented. In any such implementation, communication interface 318 sends and receives electrical, electromagnetic or optical signals that carry digital data streams representing various types of information.

Network link 320 typically provides data communication through one or more networks to other data devices. For example, network link 320 may provide a connection through local network 322 to a host computer 324 or to data equipment operated by an Internet Service Provider (ISP) 326. ISP 326 in turn provides data communication services through the world wide packet data communication network now commonly referred to as the "Internet" 328. Local network 322 and Internet 328 both use electrical, electromagnetic or optical signals that carry digital data streams. The signals through the various networks and the signals on network link 320 and through communication interface 318, which carry the digital data to and from computer system 300, are exemplary forms of carrier waves transporting the information.

Computer system 300 can send messages and receive data, including program code, through the network(s), network link 320 and communication interface 318. In the Internet example, a server 330 might transmit a requested code for an application program through Internet 328, ISP 326, local network 322 and communication interface 318. In accordance with the invention, one such downloaded application provides for preventing deadlock in policy-design constraints as described herein.

The received code may be executed by processor 304 as it is received, and/or stored in storage device 310, or other non-volatile storage for later execution. In this manner, computer system 300 may obtain application code in the form of a carrier wave.

5.0 Extensions and Alternatives

In the foregoing specification, the invention has been described with reference to specific embodiments thereof. It will, however, be evident that various modifications and changes may be made thereto without departing from the broader spirit and scope of the invention. The specification and drawings are, accordingly, to be regarded in an illustrative rather than a restrictive sense.

What is claimed is:

1. A method of preventing deadlock in policy-design constraints, the method comprising the machine-implemented steps of:
   receiving policy information based upon decisions about system configurations,
   wherein at least one policy includes at least one action having a post condition, the satisfaction of the post condition triggering at least one subsequent action or decision; and
   wherein the policy includes an indication whether the at least one subsequent action or decision should proceed if the action fails to satisfy the post condition;
   executing the at least one action; and
   determining whether the at least one subsequent action or decision can proceed based upon the indication if the action fails to satisfy the post condition;
   performing the at least one subsequent action or decision based upon the indication that the action fails to satisfy the post condition.

2. A method as recited in claim 1, further comprising:
   receiving objectives for the system configurations; and
   converting the objectives into the policy information.

3. A method as recited in claim 2, wherein the step of converting the objectives into the policy information further comprises
   determining from the objectives, a mode for the at least one action, wherein the mode indicates whether the at least one subsequent action or decision should proceed if the action fails to satisfy the post condition.

4. A method as recited in claim 1, wherein the step of determining whether the at least one subsequent action or decision can proceed based upon the indication further comprises performing the at least one subsequent action or decision, thereby preventing a deadlock.

5. A method as recited in claim 1, wherein the step of determining whether the at least one subsequent action or decision can proceed based upon the indication further comprises:
   evaluating at least one of a plurality of results from execution of the at least one of a plurality of actions;
   determining from evaluating the at least one of a plurality of results whether execution of the at least one of a plurality of actions satisfied the post condition; and
   selecting at least one subsequent action or decision that can proceed based upon which of the at least one of a plurality of actions satisfied the post condition and the indication.

6. A method as recited in claim 5, wherein the step of selecting at least one subsequent action or decision that can proceed based upon which of the at least one of a plurality of actions satisfied the post condition and the indication further comprises performing the selected at least one subsequent action or decision.

7. A method as recited in claim 5, wherein the step of selecting at least one subsequent action or decision that can proceed based upon which of the at least one of a plurality of actions satisfied the post condition and the indication further comprises selecting at least one action construct from: a redo, a redo_until a go_to, an only_if_next an alternate_action, an only_if_preceding, a jump_end, a jump_head and a nill.

8. A method as recited in claim 5, further comprising:
   receiving information about results of performing the selected at least one subsequent action or decision; and
   adjusting the objectives from which the policy information was determined.

9. A method as recited in claim 5, further comprising sending the policy information to a rule based execution device that performs the evaluating, determining and selecting steps.

10. A method as recited in claim 5, wherein the step of evaluating at least one of a plurality of results from execution of the at least one of a plurality of actions further comprises evaluating a plurality of results from execution of the plurality of actions on a plurality of nodes.

11. A machine-readable volatile volatile or non-volatile medium storing one or more sequences of instructions for preventing deadlock in policy-design constraints, which instructions, when executed by one or more processors, cause the one or more processors to carry out the steps of:
    receiving policy information based upon decisions about system configurations,
       wherein at least one policy includes at least one action having a post condition, the satisfaction of the post condition triggering at least one subsequent action or decision; and
       wherein the policy includes an indication whether the at least one subsequent action or decision should proceed if the action fails to satisfy the post condition;
    executing the at least one action; and
    determining whether the at least one subsequent action or decision can proceed based upon the indication if the action fails to satisfy the post condition;
    performing the at least one subsequent action or decision based upon the indication that the action fails to satisfy the post condition.

12. A machine-readable medium as recited in claim 11, further comprising instructions which, when executed by the one or more processors, cause the one or more processors to carry out the steps of:
    receiving objectives for the system configurations; and
    converting the objectives into the policy information.

13. A machine-readable medium as recited in claim 12, wherein the instructions for carrying out the step of converting the objectives into the policy information further comprise instructions for determining from the objectives, a mode for the at least one action, wherein the mode indicates whether the at least one subsequent action or decision should proceed if the action fails to satisfy the post condition.

14. A machine-readable medium as recited in claim 11, wherein the instructions for carrying out the step of determining whether the at least one subsequent action or decision can proceed based upon the indication further comprise instructions for carrying out the steps of:
    performing the at least one subsequent action or decision, thereby preventing a deadlock.

15. A machine-readable medium as recited in claim 11, wherein the instructions for carrying out the step of determining whether the at least one subsequent action or decision can proceed based upon the indication further comprise instructions for carrying out the steps of:
  evaluating at least one of a plurality of results from execution of the at least one of a plurality of actions;
  determining from evaluating the at least one of a plurality of results whether execution of the at least one of a plurality of actions satisfied the post condition; and
  selecting at least one subsequent action or decision that can proceed based upon which of the at least one of a plurality of actions satisfied the post condition and the indication.

16. A machine-readable medium as recited in claim 15, wherein the instructions for carrying out the step of selecting at least one subsequent action or decision that can proceed based upon which of the at least one of a plurality of actions satisfied the post condition and the indication further comprise instructions for performing the selected at least one subsequent action or decision.

17. A machine-readable medium as recited in claim 15, wherein the instructions for carrying out the step of selecting at least one subsequent action or decision that can proceed based upon which of the at least one of a plurality of actions satisfied the post condition and the indication further comprise instructions for selecting at least one action construct from: a redo, a redo_until a go_to, an only_if_next, an alternate_action, an only_if_preceding, a jump_end, a jump_head and a nill.

18. A machine-readable medium as recited in claim 15, further comprising instructions which, when executed by the one or more processors, cause the one or more processors to carry out the steps of:
  receiving information about results of performing the selected at least one subsequent action or decision; and
  adjusting the objectives from which the policy information was determined.

19. A machine-readable medium as recited in claim 15, further comprising instructions which, when executed by the one or more processors, cause the one or more processors to carry out sending the policy information to a rule based execution device that performs the evaluating, determining and selecting steps.

20. A machine-readable medium as recited in claim 15, wherein the instructions for carrying out the step of evaluating at least one of a plurality of results from execution of the at least one of a plurality of actions further comprising instructions for carrying out the steps of:
  evaluating a plurality of results from execution of the plurality of actions on a plurality of nodes.

21. An apparatus for preventing deadlock in policy-design constraints, comprising:
  a network interface that is coupled to the data network for receiving one or more packet flows therefrom;
  a memory;
  a processor;
  one or more stored sequences of instructions which, when executed by the processor, cause the processor to carry out the steps of:
    receiving policy information based upon decisions about system configurations,
      wherein at least one policy includes at least one action having a post condition, the satisfaction of the post condition triggering at least one subsequent action or decision; and
      wherein the policy includes an indication whether the at least one subsequent action or decision should proceed if the action fails to satisfy the post condition;
    executing the at least one action; and
    determining whether the at least one subsequent action or decision can proceed based upon the indication if the action fails to satisfy the post condition;
    performing the at least one subsequent action or decision based upon the indication that the action fails to satisfy the post condition.

22. An apparatus as recited in claim 21, further comprising instructions which, when executed by the one or more processors, cause the one or more processors to carry out the steps of:
  receiving objectives for the system configurations; and
  converting the objectives into the policy information.

23. An apparatus as recited in claim 22, wherein the instructions for carrying out the step of converting the objectives into the policy information further comprise instructions for carrying out determining from the objectives, a mode for the at least one action, wherein the mode indicates whether the at least one subsequent action or decision should proceed if the action fails to satisfy the post condition.

24. An apparatus as recited in claim 21, wherein the instructions for carrying out the step of
  determining whether the at least one subsequent action or decision can proceed based upon the indication further comprise instructions for performing the at least one subsequent action or decision, thereby preventing a deadlock.

25. An apparatus as recited in claim 21, wherein the instructions for carrying out the step of determining whether the at least one subsequent action or decision can proceed based upon the indication further comprise instructions for carrying out the steps of:
  evaluating at least one of a plurality of results from execution of the at least one of a plurality of actions;
  determining from evaluating the at least one of a plurality of results whether execution of the at least one of a plurality of actions satisfied the post condition; and
  selecting at least one subsequent action or decision that can proceed based upon which of the at least one of a plurality of actions satisfied the post condition and the indication.

26. An apparatus as recited in claim 25, wherein the instructions for carrying out the step of selecting at least one subsequent action or decision that can proceed based upon which of the at least one of a plurality of actions satisfied the post condition and the indication further comprise instructions for performing the selected at least one subsequent action or decision.

27. An apparatus as recited in claim 25, wherein the instructions for carrying out the step of selecting at least one subsequent action or decision that can proceed based upon which of the at least one of a plurality of actions satisfied the post condition and the indication further comprise instructions for selecting at least one action construct from: a redo, a redo_until, a go_to, an only_if_next, an alternate_action, an only_if_preceding, a jump_end, a jump_head and a nill.

28. An apparatus as recited in claim 25, further comprising instructions which, when executed by the one or more processors, cause the one or more processors to carry out the steps of:
  receiving information about results of performing the selected at least one subsequent action or decision; and
  adjusting the objectives from which the policy information was determined.

29. An apparatus as recited in claim 25, further comprising instructions which, when executed by the one or more processors, cause the one or more processors to carry out the step of sending the policy information to a rule based execution device that performs the evaluating, determining and selecting steps.

30. An apparatus as recited in claim 25, wherein the instructions for carrying out the step of evaluating at least one of a plurality of results from execution of the at least one of a plurality of actions further comprise instructions for carrying out the steps of:
evaluating a plurality of results from execution of the plurality of actions on a plurality of nodes.

* * * * *